(12) United States Patent
Zheng et al.

(10) Patent No.: US 11,386,110 B2
(45) Date of Patent: Jul. 12, 2022

(54) DATA SORTING SYSTEM AND IMPLEMENTATION METHOD THEREOF

(71) Applicant: G-CLOUD TECHNOLOGY CO. LTD, Guangdong (CN)

(72) Inventors: Kuirong Zheng, Guangdong (CN); Yongbo Li, Guangdong (CN); Tongkai Ji, Guangdong (CN)

(73) Assignee: G-CLOUD TECHNOLOGY CO. LTD, Guangdong (CN)

(*) Notice: Subject to any disclaimer, the term of this patent is extended or adjusted under 35 U.S.C. 154(b) by 608 days.

(21) Appl. No.: 16/342,502

(22) PCT Filed: Nov. 16, 2016

(86) PCT No.: PCT/CN2016/106008
§ 371 (c)(1),
(2) Date: Apr. 16, 2019

(87) PCT Pub. No.: WO2018/072250
PCT Pub. Date: Apr. 26, 2018

(65) Prior Publication Data
US 2019/0272278 A1 Sep. 5, 2019

(30) Foreign Application Priority Data

Oct. 18, 2016 (CN) .......................... 201610907638.2

(51) Int. Cl.
*G06F 16/00* (2019.01)
*G06F 16/25* (2019.01)
*G06F 16/22* (2019.01)
*G06F 16/2457* (2019.01)
*G06F 16/635* (2019.01)
(Continued)

(52) U.S. Cl.
CPC .............. *G06F 16/254* (2019.01); *G06F 7/22* (2013.01); *G06F 9/4881* (2013.01); *G06F 16/211* (2019.01); *G06F 16/2282* (2019.01); *G06F 16/24564* (2019.01); *G06F 16/24578* (2019.01); *G06F 16/635* (2019.01)

(58) Field of Classification Search
None
See application file for complete search history.

(56) References Cited

U.S. PATENT DOCUMENTS

| 6,560,592 B1* | 5/2003 | Reid | G06F 16/2468 |
| 9,244,989 B2* | 1/2016 | Boross | G06F 16/2282 |
| 9,396,201 B2* | 7/2016 | Zhou | G06F 16/166 |

* cited by examiner

*Primary Examiner* — Debbie M Le
(74) *Attorney, Agent, or Firm* — Leong C. Lei

(57) ABSTRACT

A data sorting system based on HC-TABLEs and an implementation method thereof are provided, relating to a technical field of computer application. The system provided by the present invention consists of a rule library and a sorting scheduling module. The rule library includes a sorting configuration library constituting the HC-TABLEs, and a sorting rule library and a sorting result set library based on the HC-TABLEs. The sorting scheduling module provides functions of scheduling and distribution. The scheduling function is able to transfer a structured query language of to each sorting result set into an actual data file in a task form; and the distribution function is able to distribute the data file. The present invention realizes sorting customized processing of data, has advantages of good expansibility and wide application range, and can be effectively applied in various business-type systems.

12 Claims, 3 Drawing Sheets

(51) Int. Cl.
*G06F 16/2455* (2019.01)
*G06F 9/48* (2006.01)
*G06F 7/22* (2006.01)
*G06F 16/21* (2019.01)

DATA SORTING SYSTEM AND IMPLEMENTATION METHOD THEREOF

CROSS REFERENCE OF RELATED APPLICATION

This is a U.S. National Stage under 35 U.S.C 371 of the International Application PCT/CN2016/106008, filed Nov. 16, 2016, which claims priority under 35 U.S.C. 119(a-d) to CN 201610907638.2, filed Oct. 18, 2016.

BACKGROUND OF THE PRESENT INVENTION

Field of Invention

The present invention relates to a technical field of computer application, and more particularly to a data sorting system based on HC-TABLEs and an implementation method thereof.

Description of Related Arts

With the development of the computer application technology, the involved data requirements of the users become gradually diversified. With the complication and uncertain factors of the business, it takes relatively long time to repeat the similar data requirements and the sorting work thereof. For the conventional business system, it is generally unable to uniformly customize the data sorting work. At the moment, a method having the higher flexibility and wider application range is required, which is able to rapidly respond to the business requirements and realize the uniform rule management.

SUMMARY OF THE PRESENT INVENTION

An object of the present invention is to provide a data sorting system based on HC-TABLEs. For a problem that it takes relatively long time to repeat similar data requirements and sorting work thereof, through maintaining a rule library, a detailed management of sorting data requirements is realized, which is able to split business requirements in a short time and realize data sorting. Meanwhile, rule details are stored in a form of HC-TABLE, which guarantees diversification and expansibility of the system.

Another object of the present invention is to provide an implementation method of the data sorting system based on the HC-TABLEs.

In order to accomplish the first object, following technical solutions are provided by the present invention.

A data sorting system based on HC-TABLEs consists of a rule library and a sorting scheduling module and provides corresponding development and integration interfaces, wherein:

the rule library comprises a sorting configuration library constituting the HC-TABLEs, and a sorting rule library and a sorting result set library based on the HC-TABLEs;

the sorting configuration library provides a unit component set constituting the HC-TABLEs and comprises an HC-TABLE subset component, a dictionary translation component and an HC-TABLE relationship maintenance module;

the HC-TABLE subset component is units constituting the HC-TABLEs, wherein: each HC-TABLE subset unit in the HC-TABLE subset component has unique identification and characteristics, and serves as an attribute of one HC-TABLE; and, the unique identification of each HC-TABLE subset unit is able to be user-defined into a code form and translated through the dictionary translation component;

the dictionary translation component is for translating involved codes in a sorting process and supporting translation of the codes transferred into a code form or a non-code form;

the HC-TABLE relationship maintenance module is for maintaining association relationships among the HC-TABLES, wherein: each association relationship consists of the unique identification of at least one subset unit; and, through maintaining, the relationships among the HC-TABLEs are dynamically associated, which provides a rule basis for the sorting rule library;

the sorting rule library is for providing specific sorting business rules, to maintaining an HC-TABLE relationship set with the certain business rule, and providing a sorting basis for the sorting result set library;

the sorting result set library is a set of business and is in a polymorphic form established on a basis of the sorting rule library; and, the sorting result set library provides input and output control means and controls the inputted and outputted HC-TABLE subset units, so as to generate different sorting result sets; and the sorting scheduling module provides scheduling and distribution functions, wherein: the scheduling function is able to transfer a structured query language of each sorting result set into an actual data file in a task form; and the distribution function is able to distribute the data file.

The HC-TABLEs are highly-configurable structured tables, which are able to be configured and assembled through the sorting configuration library. Each HC-TABLE consists of at least one HC-TABLE subset unit.

The sorting result set library filters sorting results through controlling an input end, and generates the sorting result sets in a polymorphic form through controlling an output end; and, each generated sorting result set is able to be represented by the structured query language and serves as a scheduling basis of the sorting scheduling module.

The rule library provides CRUD (Create-Retrieve-Update-Delete) assess interfaces for querying and maintaining configuration information of the HC-TABLE subset component, the dictionary translation component and the HC-TABLE relationship maintenance module.

In order to accomplish the second object, following technical solutions are provided by the present invention.

A method for implementing the data sorting system based on the HC-TABLEs to is provided, wherein:

the HC-TABLE subset component is configured through steps of:

(a1) selecting a generation way of each HC-TABLE subset unit, wherein the HC-TABLE subset unit is able to be newly established or an original HC-TABLE subset unit is able to be reused;

(a2) selecting a generation way of the unique identification of the HC-TABLE subset unit, wherein the unique identification is able to be user-defined or assigned by the system;

(a3) adding a subset matching library, a subset matching table and a corresponding subset matching field; and checking whether the subset unit is usable;

(a4) adding Chinese and English names of the subset matching field;

(a5) adding a presentation order, a size, an occupied length and vertical and horizontal positions of the subset unit;

(a6) adding a selectable data processing way of the subset unit wherein the data processing way comprises functions of precision obtainment, interception and mergence; and (a7) recording a log, and storing the HC-TABLE subset unit;

the dictionary translation component is configured through steps of:

(b1) newly establishing a dictionary translation item;

(b2) selecting the existing identification of the HC-TABLE subset unit;

(b3) adding a translation item corresponding to the identification;

(b4) storing an item record;

(b5) adding an existing <K, V> key value item of the subset unit;

(b6) storing the key value item; and (b7) recording a log, and finishing configuring;

the HC-TABLE relationship maintenance module is configured through steps of:

(c1) newly establishing an HC-TABLE;

(c2) adding flexible connection of at least one HC-TABLE subset unit;

(c3) storing the HC-TABLE;

(c4) adding an existing association relationship between the HC-TABLE and other HC-TABLEs, wherein the association relationship comprises left connection, right connection and full connection; associating relationships of the subset units among the HC-TABLEs, and forming a one-to-one or one-to-many mapping relationship;

(c5) storing the association relationship; and (c6) recording a log, and finishing configuring.

Preferably, the sorting rule library is maintained through steps of:

(d1) newly establishing a sorting business category, and generating a unique identification;

(d2) newly establishing a sorting rule, and generating a rule identification;

(d3) selecting at least one HC-TABLE to form a rule body;

(d4) selecting the subset unit of the selected HC-TABLE to serve as an output item;

(d5) storing the sorting rule; and (d6) recording a log, and finishing maintaining.

Preferably, the sorting result set library is managed through steps of:

(e1) newly establishing a category of the sorting result set library, and generating a unique identification;

(e2) selecting at least one sorting rule;

(e3) when selecting multiple sorting rules, checking whether an association relationship exists;

(e4) managing and configuring an input item and the output item through the data processing way of the subset unit;

(e5) selecting an output pathway of the data file;

(e6) storing the sorting result set, and generating the structured query language; and (e7) recording a log and finishing managing.

Preferably, the sorting scheduling module is managed through steps of:

(f1) newly establishing a scheduling task;

(f2) selecting the configured sorting result set;

(f3) adding an execution cycle and time;

(f4) after finishing the scheduling task, distributing data according to an output pathway of a file server configured by the sorting result set; and (f5) recording a log, and finishing managing.

For the problems of the complication and many uncertain factors of the business requirements, the present invention decomposes the data requirements and customizes the data requirements in the rule form. The rule details are stored in the HC-TABLE subset units, so as to support the multi-dimensional data processing. The HC-TABLEs uniformly manage the subset units and provide the basis for the rule implementation. The sorting result set library realizes the polymorphic rule through the input and output control. Each part in the rule library associates with each other tightly, so that the dynamic splitting processing of the data sorting requirements is actually realized, which guarantees the flexibility and expansibility of the system.

BRIEF DESCRIPTION OF THE DRAWINGS

The present invention is further illustrated with following accompanying drawings.

DETAILED DESCRIPTION OF THE PREFERRED EMBODIMENT

For a problem that it takes relatively long time to repeat similar data requirements and sorting work thereof, the present invention provides a data sorting system based on HC-TABLEs, which realizes a detailed management of sorting data requirements, and is able to split business requirements in a short time and realize data sorting.

Figure 1:
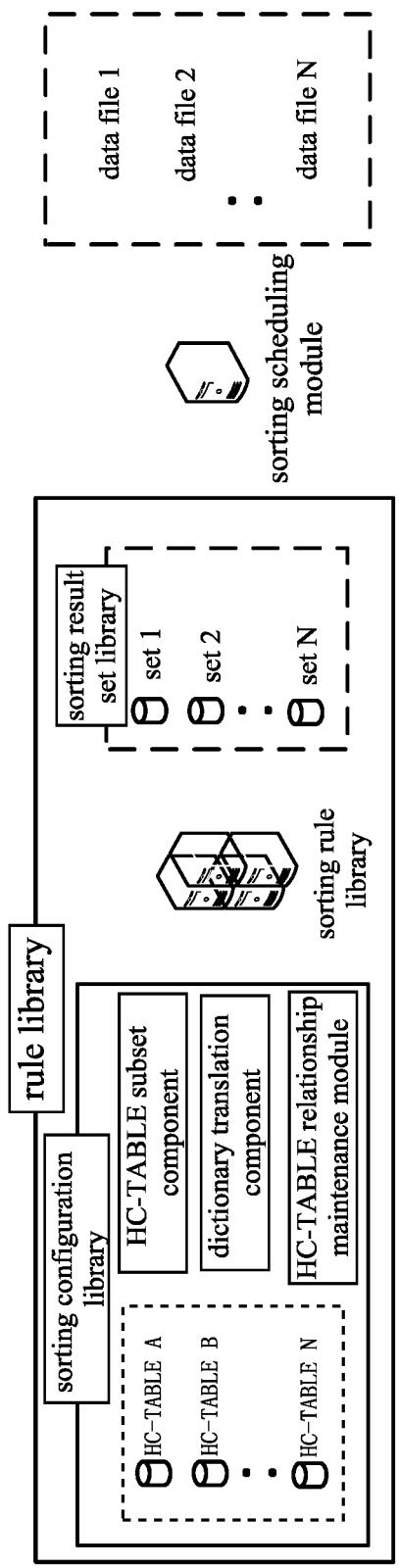
FIG. 1 is an overall structural sketch view of a data sorting system based on HC-TABLEs according to a preferred embodiment of the present invention.

FIG. 1 shows an overall structural sketch view of the data sorting system based on the HC-TABLEs, wherein the data sorting system consists of a rule library and a sorting scheduling module.

The HC-TABLEs are highly-configurable structured tables, which are able to be configured and assembled through a sorting configuration library. Each HC-TABLE consists of at least one HC-TABLE subset unit.

The rule library comprises three parts respectively of the sorting configuration library, a sorting rule library and a sorting result set library.

The sorting configuration library provides a unit component set constituting the HC-TABLES and comprises an HC-TABLE subset component, a dictionary translation component and an HC-TABLE relationship maintenance module. The HC-TABLE subset component is units constituting the HC-TABLES, wherein: each HC-TABLE subset unit in the HC-TABLE subset component has unique identification and characteristics, and serves as an attribute of one HC-TABLE; and, the unique identification of each HC-TABLE subset unit is able to be user-defined into a code form and translated through the dictionary translation component. The dictionary translation component is for translating involved codes in a sorting process and supporting translation of the codes transferred into a code form or a non-code form. The HC-TABLE relationship maintenance module is for maintaining association relationships among the HC-TABLEs, wherein: each association relationship consists of the unique identification of at least one subset unit; and, through maintaining, the relationships among the HC-TABLEs are dynamically associated, which provides a rule basis for the sorting rule library. The sorting rule library is for providing specific sorting business rules, maintaining an HC-TABLE relationship set with the certain business rule, and providing a sorting basis for the sorting result set library. The sorting result set library is a set of business and is in a polymorphic form established on a basis of the sorting rule library; the sorting result set library provides input and output control means and controls the inputted and outputted HC-TABLE subset units, so as to generate different sorting result sets; the sorting result set library filters sorting results through controlling an input end, and generates the sorting result sets in a polymorphic form through controlling an output end; and, each generated sorting result set is able to be represented by a structured query language and serves as a scheduling basis of the sorting scheduling module.

The sorting scheduling module provides scheduling and distribution functions, wherein: the scheduling function is able to transfer the structured query language of each sorting result set into an actual data file in a task form; and the distribution function is able to distribute the data file.

Moreover, the rule library provides CRUD (Create-Retrieve-Update-Delete) assess interfaces for querying and maintaining configuration information of the HC-TABLE subset component, the dictionary translation component and the HC-TABLE relationship maintenance module.

Figure 2:
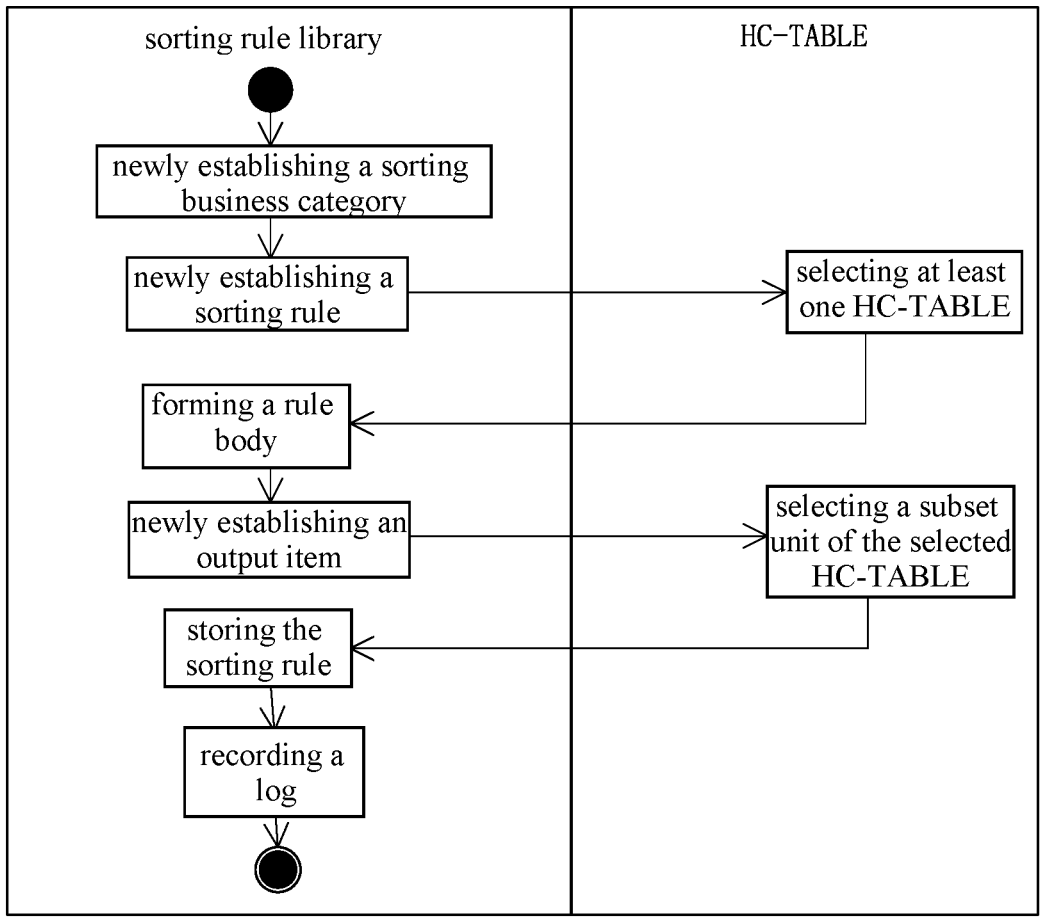
FIG. 2 is a configuration sketch view of a sorting rule library according to the preferred embodiment of the present invention.
Figure 3:
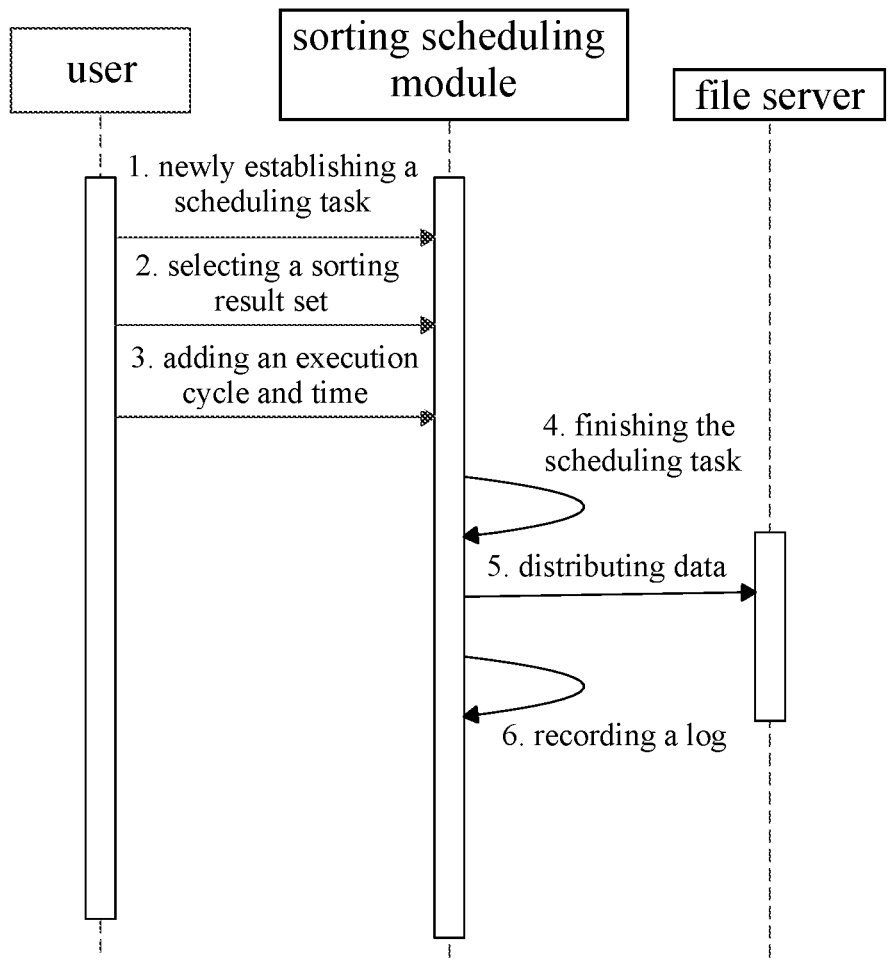
FIG. 3 is a sequence diagram of a sorting scheduling module according to the preferred embodiment of the present invention.

FIG. 2 shows a configuration sketch view of the sorting rule library. FIG. 3 shows a sequence diagram of the sorting scheduling module. Related implementation steps are described as follows.

A method for implementing the data sorting system based on the HC-TABLEs is provided, wherein:

the HC-TABLE subset component is configured through steps of:

(a1) selecting a generation way of each HC-TABLE subset unit, wherein the HC-TABLE subset unit is able to be newly established or an original HC-TABLE subset unit is able to be reused;

(a2) selecting a generation way of the unique identification of the HC-TABLE subset unit, wherein the unique identification is able to be user-defined or assigned by the system;

(a3) adding a subset matching library, a subset matching table and a corresponding subset matching field; and checking whether the subset unit is usable;

(a4) adding Chinese and English names of the subset matching field;

(a5) adding a presentation order, a size, an occupied length and vertical and horizontal positions of the subset unit;

(a6) adding a selectable data processing way of the subset unit, wherein the data processing way comprises functions of precision obtainment, interception and mergence; and (a7) recording a log, and storing the HC-TABLE subset unit;

the dictionary translation component is configured through steps of:

(b1) newly establishing a dictionary translation item;

(b2) selecting the existing identification of the HC-TABLE subset unit;

(b3) adding a translation item corresponding to the identification;

(b4) storing an item record;

(b5) adding an existing <K, V> key value item of the subset unit;

(b6) storing the key value item; and (b7) recording a log, and finishing configuring;

the HC-TABLE relationship maintenance module is configured through steps of:

(c1) newly establishing an HC-TABLE;

(c2) adding flexible connection of at least one HC-TABLE subset unit;

(c3) storing the HC-TABLE;

(c4) adding an existing association relationship between the HC-TABLE and other HC-TABLEs, wherein the association relationship comprises left connection, right connection and full connection; associating relationships of the subset units among the HC-TABLEs, and forming a one-to-one or one-to-many mapping relationship;

(c5) storing the association relationship; and (c6) recording a log, and finishing configuring.

Furthermore, the sorting rule library is maintained through steps of:

(d1) newly establishing a sorting business category, and generating a unique identification;

(d2) newly establishing a sorting rule, and generating a rule identification;

(d3) selecting at least one HC-TABLE to form a rule body;

(d4) selecting the subset unit of the selected HC-TABLE to serve as an output item;

(d5) storing the sorting rule; and (d6) recording a log, and finishing maintaining.

Furthermore, the sorting result set library is managed through steps of:

(e1) newly establishing a category of the sorting result set library, and generating a unique identification;

(e2) selecting at least one sorting rule;

(e3) when selecting multiple sorting rules, checking whether an association relationship exists;

(e4) managing and configuring an input item and the output item through the data processing way of the subset unit;

(e5) selecting an output pathway of the data file;

(e6) storing the sorting result set, and generating the structured query language; and (e7) recording a log and finishing managing.

Furthermore, the sorting scheduling module is managed through steps of:

(f1) newly establishing a scheduling task;

(f2) selecting the configured sorting result set;

(f3) adding an execution cycle and time;

(f4) after finishing the scheduling task, distributing data according to an output pathway of a file server configured by the sorting result set; and (f5) recording a log, and finishing managing.

The present invention realizes the sorting customized processing of the data, has advantages of good expansibility and wide application range, and can be effectively applied in various business-type systems.

What is claimed is:
1. A data sorting method, comprising steps of:
configuring a rule library, and configuring a sorting scheduling module, wherein the rule library comprises a sorting configuration library constituting highly-configurable structured tables (HC-TABLEs), and a sorting rule library and a sorting result set library based on the HC-TABLES; the HC-TABLEs are able to be configured and assembled through the sorting configuration library; and, each HC-TABLE consists of at least one HC-TABLE subset unit;

the sorting configuration library provides a unit component set constituting the HC-TABLEs and comprises an HC-TABLE subset component, a dictionary translation component and an HC-TABLE relationship maintenance module;

the HC-TABLE subset component is units constituting the HC-TABLEs, wherein: each HC-TABLE subset unit in the HC-TABLE subset component has unique identification and characteristics, and serves as an attribute of one HC-TABLE; and, the unique identification of each HC-TABLE subset unit is able to be user-defined and translated through the dictionary translation component;

the dictionary translation component is for translating involved codes in a sorting process;

the HC-TABLE relationship maintenance module is for maintaining association relationships among the HC-TABLEs, wherein: each association relationship consists of the unique identification of at least one subset unit; and, through maintaining, the relationships among the HC-TABLEs are dynamically associated, which provides a rule basis for the sorting rule library;

the sorting rule library is for providing a sorting basis for the sorting result set library;

the sorting result set library is a set of business and is in a polymorphic form established on a basis of the sorting rule library; and, the sorting result set library provides input and output control means and controls the inputted and outputted HC-TABLE subset units, so as to generate different sorting result sets; and the sorting scheduling module provides scheduling and distribution functions, wherein: the scheduling function is able to transfer a structured query language of each sorting result set into an actual data file in a task form; and the distribution function is able to distribute the data file;

the HC-TABLE subset component is configured through steps of:

(a1) selecting a generation way of each HC-TABLE subset unit, wherein the HC-TABLE subset unit is able to be newly established or an original HC-TABLE subset unit is able to be reused;

(a2) selecting a generation way of the unique identification of the HC-TABLE subset unit, wherein the unique identification is able to be user-defined or assigned by the system;

(a3) adding a subset matching library, a subset matching table and a corresponding subset matching field; and checking whether the subset unit is usable;

(a4) adding Chinese and English names of the subset matching field;

(a5) adding a presentation order, a size, an occupied length and vertical and horizontal positions of the subset unit;

(a6) adding a selectable data processing way of the subset unit, wherein the data processing way comprises functions of precision obtainment, interception and mergence; and (a7) recording a log, and storing the HC-TABLE subset unit;

the dictionary translation component is configured through steps of:

(b1) newly establishing a dictionary translation item;

(b2) selecting the existing identification of the HC-TABLE subset unit;

(b3) adding a translation item corresponding to the identification;

(b4) storing an item record;

(b5) adding an existing <K, V> key value item of the subset unit;

(b6) storing the key value item; and (b7) recording a log, and finishing configuring;

the HC-TABLE relationship maintenance module is configured through steps of:

(c1) newly establishing an HC-TABLE;

(c2) adding flexible connection of at least one HC-TABLE subset unit;

(c3) storing the HC-TABLE;

(c4) adding an existing association relationship between the HC-TABLE and other HC-TABLEs, wherein the association relationship comprises left connection, right connection and full connection; associating relationships of the subset units among the HC-TABLEs, and forming a one-to-one or one-to-many mapping relationship;

(c5) storing the association relationship; and (c6) recording a log, and finishing configuring.

2. The data sorting method, as recited in claim 1, wherein the sorting rule library is maintained through steps of:

(d1) newly establishing a sorting business category, and generating a unique identification;

(d2) newly establishing a sorting rule, and generating a rule identification;

(d3) selecting at least one HC-TABLE to form a rule body;

(d4) selecting the subset unit of the selected HC-TABLE to serve as an output item;

(d5) storing the sorting rule; and (d6) recording a log, and finishing maintaining.

3. The data sorting method, as recited in claim 1, wherein the sorting result set library is managed through steps of:

(e1) newly establishing a category of the sorting result set library, and generating a unique identification;

(e2) selecting at least one sorting rule;

(e3) when selecting multiple sorting rules, checking whether an association relationship exists;

(e4) managing and configuring an input item and an output item through the data processing way of the subset unit;

(e5) selecting an output pathway of the data file;

(e6) storing the sorting result set, and generating the structured query language; and (e7) recording a log and finishing managing.

4. The data sorting method, as recited in claim 2, wherein the sorting result set library is managed through steps of:

(e1) newly establishing a category of the sorting result set library, and generating a unique identification;

(e2) selecting at least one sorting rule;

(e3) when selecting multiple sorting rules, checking whether an association relationship exists;

(e4) managing and configuring an input item and an output item through the data processing way of the subset unit;

(e5) selecting an output pathway of the data file;

(e6) storing the sorting result set, and generating the structured query language; and (e7) recording a log and finishing managing.

5. The data sorting method, as recited in claim 1, wherein the sorting scheduling module is managed through steps of:

(f1) newly establishing a scheduling task;

(f2) selecting the configured sorting result set;

(f3) adding an execution cycle and time;

(f4) after finishing the scheduling task, distributing data according to an output pathway of a file server configured by the sorting result set; and
(f5) recording a log, and finishing managing.

6. The data sorting method, as recited in claim 2, wherein the sorting scheduling module is managed through steps of:
(f1) newly establishing a scheduling task;
(f2) selecting the configured sorting result set;
(f3) adding an execution cycle and time;
(f4) after finishing the scheduling task, distributing data according to an output pathway of a file server configured by the sorting result set; and
(f5) recording a log, and finishing managing.

7. The data sorting method, as recited in claim 3, wherein the sorting scheduling module is managed through steps of:
(f1) newly establishing a scheduling task;
(f2) selecting the configured sorting result set;
(f3) adding an execution cycle and time;
(f4) after finishing the scheduling task, distributing data according to an output pathway of a file server configured by the sorting result set; and
(f5) recording a log, and finishing managing.

8. The data sorting method, as recited in claim 4, wherein the sorting scheduling module is managed through steps of:
(f1) newly establishing a scheduling task;
(f2) selecting the configured sorting result set;
(f3) adding an execution cycle and time;
(f4) after finishing the scheduling task, distributing data according to an output pathway of a file server configured by the sorting result set; and
(f5) recording a log, and finishing managing.

9. A data sorting method, comprising steps of:
configuring a rule library, and configuring a sorting scheduling module, wherein the rule library comprises a sorting configuration library constituting highly-configurable structured tables (HC-TABLEs), and a sorting rule library and a sorting result set library based on the HC-TABLEs; the HC-TABLEs are able to be configured and assembled through the sorting configuration library; and, each HC-TABLE consists of at least one HC-TABLE subset unit;
the sorting configuration library provides a unit component set constituting the HC-TABLEs and comprises an HC-TABLE subset component, a dictionary translation component and an HC-TABLE relationship maintenance module; the rule library provides CRUD (Create-Retrieve-Update-Delete) assess interfaces for querying and maintaining configuration information of the HC-TABLE subset component, the dictionary translation component and the HC-TABLE relationship maintenance module;
the HC-TABLE subset component is units constituting the HC-TABLES, wherein: each HC-TABLE subset unit in the HC-TABLE subset component has unique identification and characteristics, and serves as an attribute of one HC-TABLE; and, the unique identification of each HC-TABLE subset unit is able to be user-defined and translated through the dictionary translation component;
the dictionary translation component is for translating involved codes in a sorting process;
the HC-TABLE relationship maintenance module is for maintaining association relationships among the HC-TABLES, wherein: each association relationship consists of the unique identification of at least one subset unit; and, through maintaining, the relationships among the HC-TABLEs are dynamically associated, which provides a rule basis for the sorting rule library;
the sorting rule library is for providing a sorting basis for the sorting result set library;
the sorting result set library is a set of business and is in a polymorphic form established on a basis of the sorting rule library; and, the sorting result set library provides input and output control means and controls the inputted and outputted HC-TABLE subset units, so as to generate different sorting result sets; and
the sorting scheduling module provides scheduling and distribution functions, wherein: the scheduling function is able to transfer a structured query language of each sorting result set into an actual data file in a task form; and the distribution function is able to distribute the data file;
the HC-TABLE subset component is configured through steps of:
(a1) selecting a generation way of each HC-TABLE subset unit, wherein the HC-TABLE subset unit is able to be newly established or an original HC-TABLE subset unit is able to be reused;
(a2) selecting a generation way of the unique identification of the HC-TABLE subset unit, wherein the unique identification is able to be user-defined or assigned by the system;
(a3) adding a subset matching library, a subset matching table and a corresponding subset matching field; and checking whether the subset unit is usable;
(a4) adding Chinese and English names of the subset matching field;
(a5) adding a presentation order, a size, an occupied length and vertical and horizontal positions of the subset unit;
(a6) adding a selectable data processing way of the subset unit, wherein the data processing way comprises functions of precision obtainment, interception and mergence; and
(a7) recording a log, and storing the HC-TABLE subset unit;
the dictionary translation component is configured through steps of:
(b1) newly establishing a dictionary translation item;
(b2) selecting the existing identification of the HC-TABLE subset unit;
(b3) adding a translation item corresponding to the identification;
(b4) storing an item record;
(b5) adding an existing <K, V> key value item of the subset unit;
(b6) storing the key value item; and
(b7) recording a log, and finishing configuring;
the HC-TABLE relationship maintenance module is configured through steps of:
(c1) newly establishing an HC-TABLE;
(c2) adding flexible connection of at least one HC-TABLE subset unit;
(c3) storing the HC-TABLE;
(c4) adding an existing association relationship between the HC-TABLE and other HC-TABLEs, wherein the association relationship comprises left connection, right connection and full connection; associating relationships of the subset units among the HC-TABLEs, and forming a one-to-one or one-to-many mapping relationship;
(c5) storing the association relationship; and
(c6) recording a log, and finishing configuring.

10. The data sorting method, as recited in claim 9, wherein the sorting rule library is maintained through steps of:
- (d1) newly establishing a sorting business category, and generating a unique identification;
- (d2) newly establishing a sorting rule, and generating a rule identification;
- (d3) selecting at least one HC-TABLE to form a rule body;
- (d4) selecting the subset unit of the selected HC-TABLE to serve as an output item;
- (d5) storing the sorting rule; and
- (d6) recording a log, and finishing maintaining.

11. The data sorting method, as recited in claim 10, wherein the sorting result set library filters sorting results through controlling an input end, and generates the sorting result sets through controlling an output end; and, each generated sorting result set is able to be represented by the structured query language and serves as a scheduling basis of the sorting scheduling module; the sorting result set library is managed through steps of:
- (e1) newly establishing a category of the sorting result set library, and generating a unique identification;
- (e2) selecting at least one sorting rule;
- (e3) when selecting multiple sorting rules, checking whether an association relationship exists;
- (e4) managing and configuring an input item and an output item through the data processing way of the subset unit;
- (e5) selecting an output pathway of the data file;
- (e6) storing the sorting result set, and generating the structured query language; and
- (e7) recording a log and finishing managing.

12. The data sorting method, as recited in claim 11, wherein the sorting scheduling module is managed through steps of:
- (f1) newly establishing a scheduling task;
- (f2) selecting the configured sorting result set;
- (f3) adding an execution cycle and time;
- (f4) after finishing the scheduling task, distributing data according to an output pathway of a file server configured by the sorting result set; and
- (f5) recording a log, and finishing managing.

* * * * *